M. G. BRANDAO.
AUTOMATIC STEERING MECHANISM.
APPLICATION FILED AUG. 17, 1911.
1,084,392.
Patented Jan. 13, 1914.
4 SHEETS—SHEET 3.
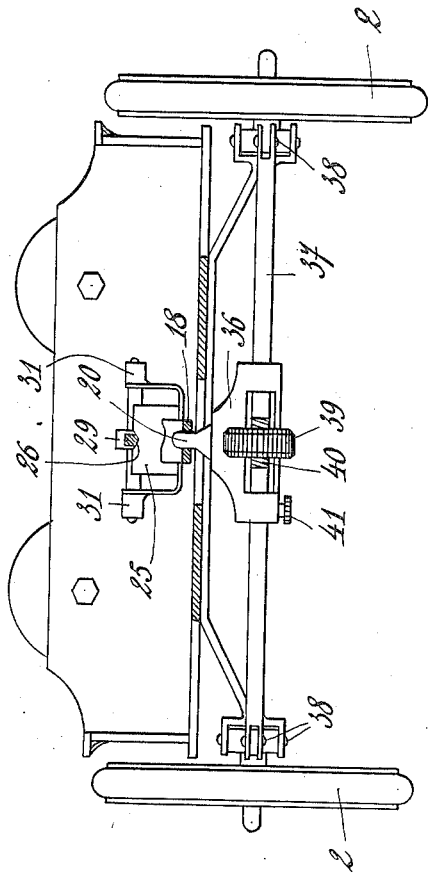
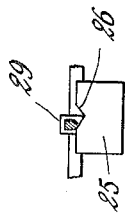
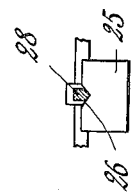
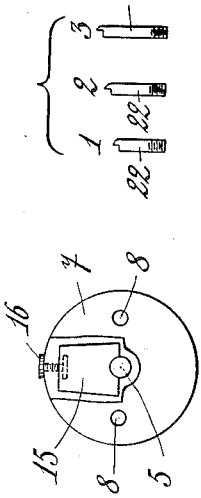
Witnesses:
Waldo M Chapin
William C Lang
Inventor.
Mario Gomes Brandao.
by
Rosenbaum & Stockbridge
Attys.

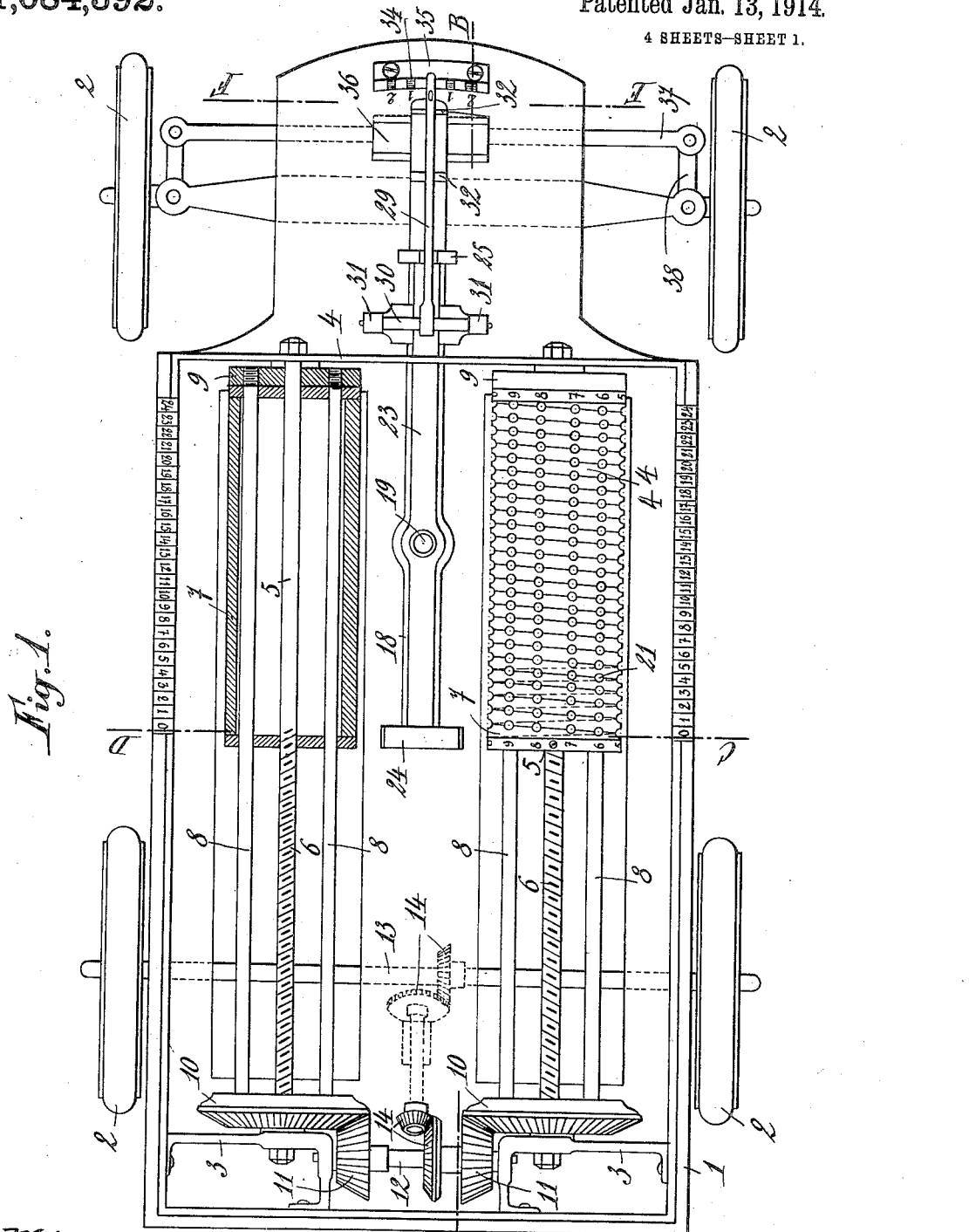

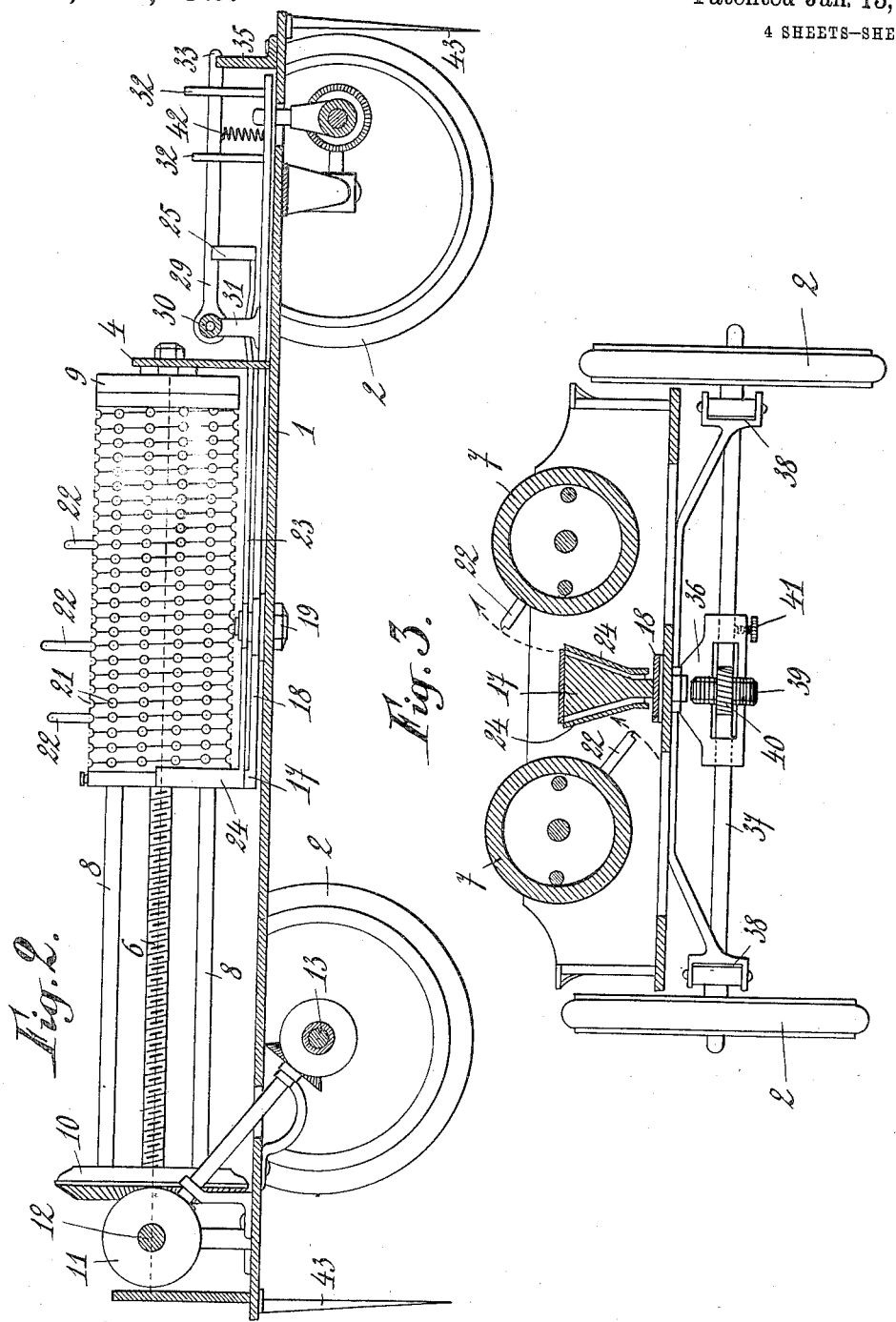

M. G. BRANDAO.
AUTOMATIC STEERING MECHANISM.
APPLICATION FILED AUG. 17, 1911.
1,084,392.
Patented Jan. 13, 1914.
4 SHEETS—SHEET 4.
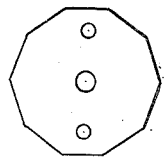
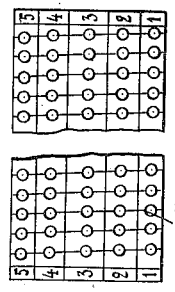
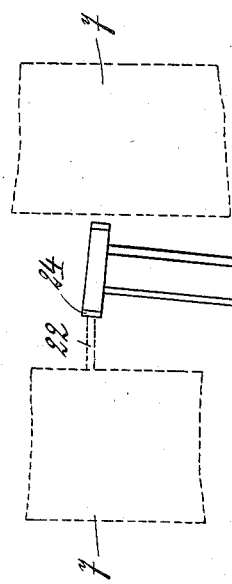
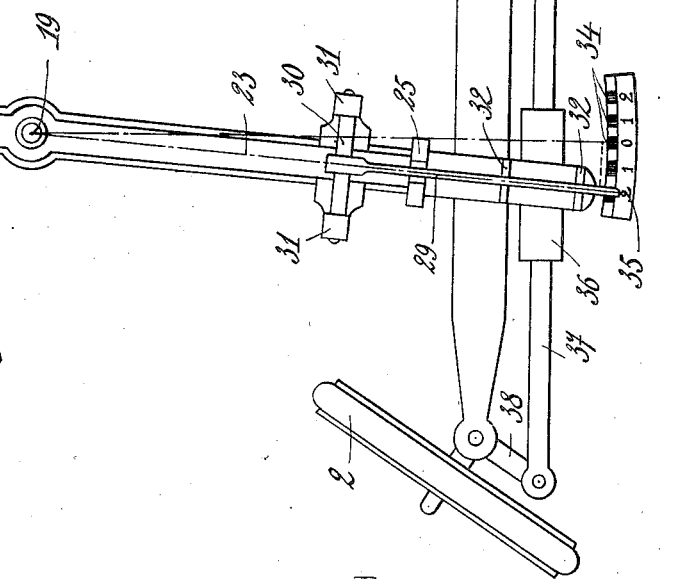
Witnesses:
Waldo M Chapin
William C. Lany
Inventor
Mario Gomez Brandao,
by
Rosenbaum & Stockbridge
Attys.

UNITED STATES PATENT OFFICE.

MARIO GOMES BRANDAO, OF BRUSSELS, BELGIUM.

AUTOMATIC STEERING MECHANISM.

1,084,392.　　　　Specification of Letters Patent.　　Patented Jan. 13, 1914.

Application filed August 17, 1911. Serial No. 644,674.

*To all whom it may concern:*

Be it known that I, MARIO GOMES BRANDAO, a citizen of the Republic of Brazil, residing at Brussels, in the Kingdom of Belgium, have invented new and useful Improvements in Automatic Steering Mechanism, of which the following is a specification.

This invention relates to automatic steering mechanism applicable to any movable object which is displaced under the action of a suitable motor and more particularly to automobile torpedoes, to small boats designed for studying maritime currents or for saving vessels in danger or for other uses, to non-mounted dirigible balloons, to motor vehicles designed for the automatic transport of certain materials, or to different kinds of toy automobiles which are required to travel in various directions in order to render them more attractive.

One object of the invention is to provide new and original means adapted to coöperate with the ordinary steering mechanism with which the movable object is provided (for example with the rudder or with the steering bar of the steering wheels of a movable object mounted upon wheels) so as to cause the said mechanism to assume given angular positions at given or predetermined moments.

With this object in view, my invention essentially consists in special combinations of parts and mechanical elements as will hereinafter be fully described and pointed out in the appended claims.

In order to enable my invention to be fully understood I will describe it by way of example as applied to a small motor vehicle.

Figure 1 shows the complete system in plan view and partly in section. Fig. 2 is a longitudinal section taken on the line A—B, Fig. 1. Fig. 3 is a transverse section through the line C—D of Fig. 1, and Fig. 4 a transverse section through the line E—F of Fig. 1. Fig. 5 is a view of a detail of a cylinder carrying movable and adjustable stops. Fig. 6 is a detached view of three of the stops coöperating with the cylinders. Figs. 7 and 8 are two detailed views showing means for unlocking a brake normally maintaining an oscillating lever in its normal position. Figs. 9 and 10 show in side elevation and front elevation a modification of one of the cylinders carrying the stops. Fig. 11 is a diagrammatic view illustrating the position of the mechanism at the moment when it is brought into action. Fig. 12 shows partially in elevation and in longitudinal section, a further modification of the construction of the cylinders carrying the stops. Figs. 13 and 14 show respectively in front elevation and side elevation the stops coöperating with the construction of cylinder shown in Fig. 12.

On the under frame 1 of the vehicle provided with wheels 2 are fixed in brackets 3 and 4 two shafts 5 screw-threaded for a portion of their length 6. Upon these shafts can rotate two cylinders 7 set in rotation by actuating rods 8 fixed at one end in a plate 9 and at the other end in pinions 10, revolving upon the shafts 5 and turned by pinions 11 carried by a shaft 12, receiving motion from the driving axle 13 through a gear 14 of suitable construction. The cylinders 7 can be engaged with the threaded part 6 of the shafts 5 by means of plate 15 (Fig. 5) adapted to be lowered on to the shaft 5 by means of a screw 16. This plate 15 acts like a portion of a nut upon the threaded part 6 of the shaft 5 so that when it is lowered the cylinders 7 are moved along by the shaft 5 and are compelled to move longitudinally over the threaded portions 6 thus effecting the travel determined by the length of these threaded portions.

Between the cylinders 7 rises up to the level of their axial plane a projection 17 carried by a lever 18 oscillating upon a pivot 19. This lever 18 receives at its end opposite the projection 17 in a suitable slot the end 20 of a member fixed to the connecting bar of the steering wheels.

It will be easily seen from the foregoing description that if the cylinders 7 are provided with holes 21 arranged along a given curve, in the direction of a helix or screw for example, and if stops 22 of the kind shown in Fig. 6 are placed in certain of these holes, the said stops will, when the cylinders 7 are rotated and displaced, act sometimes on one side and sometimes on the other side of the piece 17 projecting between the cylinders 7. This will obviously result in oscillations of the lever 18 which can be transmitted to the steering wheels by the member 20 connecting the lever 18 to the connecting bar of the cranked levers of the steering wheels. In practice, however, the arrangement should be completed by certain auxiliary mechanism designed to insure greater regularity and greater precision of working. It is necessary, especially, to be able to insure the lever 18 being held in its normal position when it is not subjected to the action of the stops 22. For this purpose upon the pivot 19 is mounted a second oscillating lever 23 which can turn upon the pivot 19 without rubbing upon the lever 18. This lever 23 is terminated at one end by a fork 24 the branches of which embrace the piece 17 with a certain play (Fig. 3). The other end of the lever 23 is terminated by a plate 25 (Figs. 7 and 8) provided with a notch 26 in which normally rests (Fig. 7) a knife edged portion 28 of a lever 29 called "hammer brake". This lever can oscillate with a shaft 30 in small brackets 31 carried by the lever 18; it is guided between vertical forks 32 carried by the lever 18 and its end 33 engages in notches 34 (Fig. 1) of a sector 35 carried by the frame of the motor carriage. In these conditions when the piece 25 is in the position shown in Fig. 7 the lever 29 of the hammer brake is engaged in the notch 34 of the sector 35 which corresponds to the normal position of the lever 18, that is to say, to the travel of the vehicle in a straight line. When one of the stops 22 comes into action it operates at first upon one of the branches of the fork 24 and causes it to deviate slightly until this branch is applied against the corresponding face of the projection 17. By reason of the slight oscillation of the lever 23 which results from this action the piece 25 occupies the position shown in Fig. 8 in which position the knife-edge 28 of the lever 29 mounts over the inclined face of the notch 26. This results in a slight lifting of the hammer brake 29 the effect of which is to disengage its end 33 from the central notch of the sector 35. The lever 18 is thus unlocked and during the further rotation of the cylinders 7 it can be angularly displaced by the stop 22 as shown in Fig. 11 so that the steering wheels assume the given inclination.

Fig. 11 shows the sector 35 provided with five stop notches for the end 33 of the "hammer-brake" 29, so that the oscillating lever 18 can occupy a position marked 0 corresponding to the travel in a straight line and on each side of this position two angular positions marked 1 and 2.

The member 20 upon which acts the lever 18 is not directly integral with the actuating bar of the steering wheels. This member is connected to the said bar through the medium of an auxiliary member 36 which I call a rectifier. Through the said rectifier passes the bar 37 connecting the cranked levers 38 controlling the position of the steering wheels and the said rectifier embraces a wheel 39 forming a nut upon the threaded central part of the bar 37. The auxiliary member 36 serving to house the nut 39, it is obvious that when the member 36 is displaced by the lever 18 it draws the bar 37 along in one or the other direction. On the contrary if for any reason when the lever 18 is in its normal position, the steering wheels are not exactly parallel with the axis of the vehicle, the position of the wheels can be rectified by acting upon the nut 39. The latter in turning causes the bar 37 to become displaced in one or the other direction. After regulation the member 36 can be fixed upon the bar 37 by means of a screw 41.

The above explanation will enable the working of the apparatus to be fully understood. As already stated the transmission of power to the steering mechanism is preferably derived from any device having a movement proportionate to the speed of the car. In the example chosen of a toy automobile the movements will be taken to the rear axle which is fixed to the single driving wheel of the vehicles, the other wheel being free and capable of turning, as is known, more or less quickly with relation to the driving wheel, according as in a curve, the said free wheel is exterior or interior with relation to the driving wheel. Calculations of distances to be traveled by the apparatus must consequently be based upon the distance traveled by the driving wheel.

It will be readily seen by reference to the drawings that as soon as the apparatus is started the cylinders 7 are also rotated by the gear rods 8 turning with the pinions 10. If the screws 6 of the shafts 5 and the helices around which the holes 21 in the cylinders 7 are arranged have the same pitch, the cylinders in their movement will cause all the consecutive points of the helices to pass successively in front of the piece 17 and in front of the fork 24 and each fraction of the helix developed in front of the piece 17 will represent a certain distance traveled over by the movable object in space. This distance can be measured upon the helices in the following manner:—In the motor vehicle represented in Fig. 1 the driving wheels have been supposed to have a development of exactly 20 cm.; therefore the apparatus will advance 20 cm. at each revolution of its wheels.

The transmission from the axle to the cylinders is a demultiplication reducing the movement of the latter to a fifth of that of the wheels. It is therefore necessary that the wheels shall perform five complete revolutions in order that the cylinders may perform one and cause to pass in front of the piece 24 a complete convolution or turn of their helices. But five revolutions of wheels correspond to 5×20 cm.=1 meter and consequently each complete turn equals one meter upon the ground. Now, as is shown in Fig. 1 for one of the cylinders 7 the circumference of the latter and therefore, all the turns, are divided by the rows of holes into ten equal parts numbered 0, 1, 2 . . . 9. Consequently the total length of the helix is the product of the number of turns through the space 0, 1, 2 . . . which naturally become its unit of measure, and this unit being the tenth part of a turn will obviously correspond to 1 decimeter upon the ground. If, however, there are 25 complete turns upon each cylinder the complete helix will correspond to 250 decimeters or 25 meters, which will be the total distance that the car would be able to travel over ground until the arrival of the cylinders 7 at the end of their course. Fig. 1 also shows fixed to each side of the apparatus two scales divided into 25 parts of 4 mm. each (the pitch of the helix) numbered from 0, to 24. (In Fig. 2 the dotted line corresponding to the axis of the cylinders 7 indicates the height or position of the scales.) When the cylinders are in their initial position, each of the convolutions or turns comes opposite one of the said divisions so that if the cylinders are caused to make a single complete revolution each turn will pass entirely in front of the division which corresponds to it without exceeding the limits of it. Consequently the figures of these scales mark the number of the turns and represent the tens seeing that each turn contains exactly 10 holes or ten spaces 0, 1, 2 . . . . . On the other hand the figures which are at the head of the cylinder, corresponding each with a row of holes, represent the units. Consequently in order to find the hole which corresponds to a certain number, the figures of the scale must be combined with those of the cylinder. For this purpose it is necessary to cause the cylinder 7 to revolve so that it presents in front of the scale the row of holes of which the figure represents the units of the required number and, opposite the number of the scale which represents the tens thereof, will be found the required hole.

Supposing the unit of measure corresponds to 1 decimeter upon the ground, if it is desired to find the hole which corresponds to a certain distance 20 m. 30 for example, this distance must be expressed in decimeters namely 203 dec. and it will only be necessary to place the row 3 in front of the fixed scale in order to find the hole sought for, opposite the number 20.

If the apparatus has been previously rectified and it is caused to start, its controlling lever being placed in the position indicated in Fig. 1 the displacement will take place in a straight line.

An inspection of Figs. 1 and 2 will show that the cylinders 7 can revolve and that the stops 22 can pass beside the lever without touching either the horizontal part or the vertical part 17 thereof as these two parts, whatever may be the position of the lever 18 always remain outside the range of the cylinders. Now, the position of the wheels cannot of themselves become altered, seeing that these wheels are connected through the medium of the "hammer-brake" 29 to the under frame of the apparatus. If, therefore, the latter becomes displaced over a horizontal and regular ground, at the end of its course simply a straight line will have been described of 25 meters in length. But suppose that instead of a straight course of 25 meters it is desired to only perform a distance of 8 meters and after this distance a curve of a certain radius toward the right hand, one of the stops 22 is, according to the method already indicated placed in the hole No. 80 of the right hand cylinder. The apparatus being started the cylinders revolve freely until the arrival of the stop in front of the piece 24 which embraces the vertical part 17 of the lever 18. At this moment the stop is compelled to exert a certain pressure upon the wall of the piece 24. There results a displacement of the piece 24 and the disengagement of the hammer-brake 29 in the manner already pointed out and afterward the displacement of the lever 18; the displacement of this lever continues until the moment when the stop 22 arrives in the horizontal position. At this moment the piece 24 is disengaged and the hammer-brake which is not longer held is brought back into the notch of the sector 35 in front of which it is located. A spring 42 assists to bring back the hammer-brake into its engaging position. The apparatus then commences to describe an arc of a circle and this movement continues until a new stop 22 carried by the other cylinder 7 brings back the lever 18 by a similar operation into its central position.

Each cylinder can obviously be provided with a certain number of stops the positions of which are suitably chosen to cause the apparatus to follow a given course. It should however be observed that the apparatus does not pass immediately from a straight line to an arc of a circle and vice versa. In other words the straight line is never tangential to the arc of a circle which follows or which precedes it. In fact at the precise moment when the lever 18 commences to be displaced by the stop 22 the apparatus abandons the straight line or the arc of a circle that it followed. The line that it then describes is no longer a straight line any more than it is an arc of a circle seeing that the wheels are inclined in proportion as the apparatus advances. The path traveled over is therefore represented by a curve the radius of which continually increases or diminishes until the stop arrives in its horizontal position which is the limit of its action upon the lever. This curve which is really, a portion of a spiral, can be easily calculated in each case.

The apparatus described can be completed by two points 43 placed upon a common longitudinal axis of the apparatus and which serves to facilitate the rectification of the regulation of the position of the steering wheels. For this purpose a straight line of a certain length is marked upon a regular and perfectly horizontal ground and the apparatus is afterward placed upon one of the ends of the said straight line so that the pieces 43 coincide with the said straight line. The apparatus is then started. When it arrives at the other end of the straight line the points 43 must still coincide with the latter. If this is not so, the regulation of the position of the wheels is rectified in the manner already indicated.

The apparatuses provided with a steering mechanism thus constructed can travel over predetermined courses with great precision either upon a horizontal and regular ground or in a tranquil fluid. If it should be desired to make them travel over an inclined and irregular ground or in a fluid in movement or traversed by currents it would obviously be necessary to take into account any deviations caused by the unevenness of the ground or by the direction and speed of the currents to be traversed.

The cylinders 7 need not necessarily be made in the manner indicated; they can be replaced by prisms of the kind shown in Figs. 9—10. In this construction the prisms have as many faces 44 as there are rows of holes 21. The rectangles forming the faces of the prisms are screwed on to the polygons 45 (Fig. 10) forming the bases of the prisms. This construction has the advantage of being particularly simple and practical.

Fig. 12 shows another modification in which the stops instead of being placed in holes provided in the cylinders are held by frictional engagement in a suitable groove formed on the periphery of the cylinder. In said construction the cylinder properly so called is provided with a screw thread 46 upon which is fixed a spiral or helix 47 which can be held in position by means of screws 48 screwed in the screw-thread of the cylinder. The stops 49 (Figs. 13—14) can be introduced in the groove 50 formed by the screw-thread 46 coöperating with the spiral 47 and are provided with lugs 51 adapted to be engaged under the spiral by turning the stops from 90° with regard to the position in which they are introduced in the groove 50; they are then held in position by means of a nut 52 bearing upon the surface of the spiral 47. This construction is particularly advantageous when it is desired to give to the stops any position whatever along the turns of the helix formed on the cylinders. In this case, indeed, the number of positions which can be given to the stops is not restricted to the number of holes provided in the cylinders; the stops can be placed in any given position by only unscrewing the corresponding nut 52 and causing the stop to slide in the groove 50; this feature may be important when it is necessary to exactly determine the travel of the movable body to which the steering mechanism is to be applied.

Other modifications of details can obviously be made in mechanism of this nature without departing from the spirit of the invention. It is to be understood in fact that the construction above described is only given by way of example and that it is in no way limitary.

The means of construction can be varied to a large extent in each case that is to say, according to each special application under consideration.

What I claim is:

1. An automatic steering mechanism, comprising the combination of a steering member, a helical carrier, adjustable stops adapted to be applied to said carrier, means whereby said stops may actuate said steering member and means for rotating said helical stop carrier.

2. An automatic steering mechanism comprising the combination of a steering member, an oscillating lever adapted to actuate said steering member, and two helical stop carriers adapted to be rotated upon their axes and to move longitudinally thereof, adjustable stops adapted to be applied to various points upon the said helical carriers, the stops of one carrier being adapted to actuate said oscillating lever in one direction, while the stops of the other carrier are adapted to actuate said lever in the opposite direction.

3. An automatic steering mechanism comprising the combination of a steering member and an oscillating lever adapted to actuate the same, a locking device for said lever, a helical stop carrier provided with a rotary, axial motion, adjustable stops adapted to be applied upon various points upon said carrier and means whereby said stops will first actuate the locking device and then actuate the oscillating lever, for the purpose set forth.

4. In a device of the kind described, the combination of a movable object, a steering member therefor, an oscillating lever adapted to actuate said steering member, a carrier, adjustable stops thereon and means whereby the propelling power of the movable object will move said stops in the direction of a helix into coöperating relation with the oscillating lever.

5. In a device of the kind described, the combination of a movable object, a steering member, an oscillating lever adapted to actuate said steering member, adjustable stops, cylinders carrying said stops, means whereby the cylinders will rotate in relation to the motion of the movable object, and means for moving said cylinders axially while they are rotating, whereby the stops carried by said cylinders are moved in the direction of a helix in operative relation with the oscillating lever.

6. In a device of the kind described in combination, a movable object, propelling means, a steering member for said object, an oscillating lever adapted to actuate said steering member, adjustable stops, carrying means for said stops, means for displacing said carrying means axially, and means for rotating said carrying means conjointly with their axial displacement, said means being placed under the control of the propelling means.

In testimony whereof I have signed my name to this specification in the presence of two subscribing witnesses.

MARIO GOMES BRANDAO.

Witnesses:
CHAS. ROY NASMITH,
JACQUES SEDE.